Figure 8:
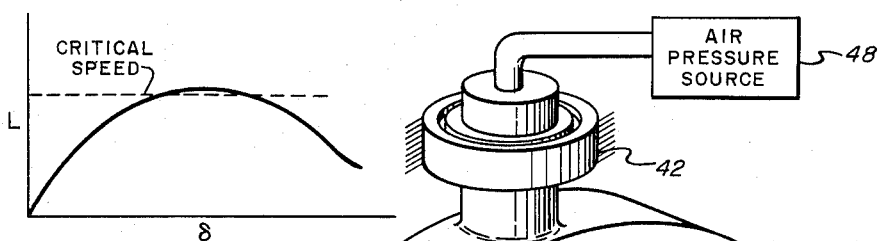

April 14, 1964   F. SAPHRA   3,129,301
ANGULAR SPEED RESPONSIVE DEVICE
Filed Nov. 14, 1960   2 Sheets-Sheet 1
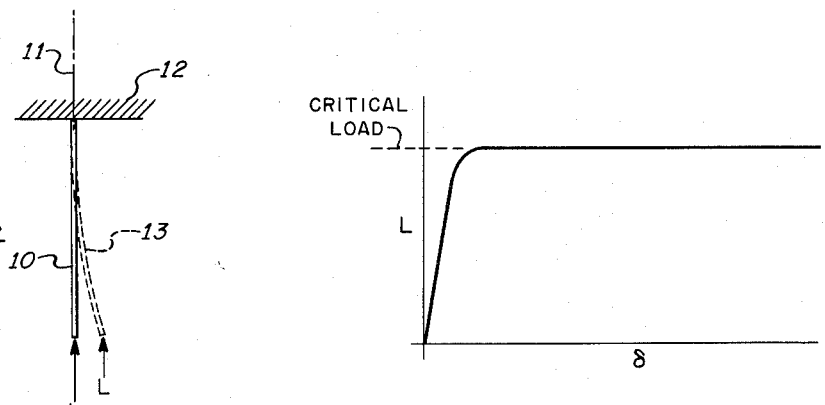
FIG.1.
FIG.2.
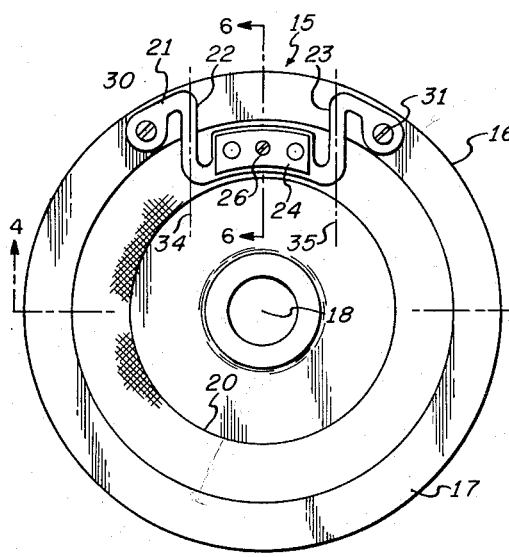
FIG.3.
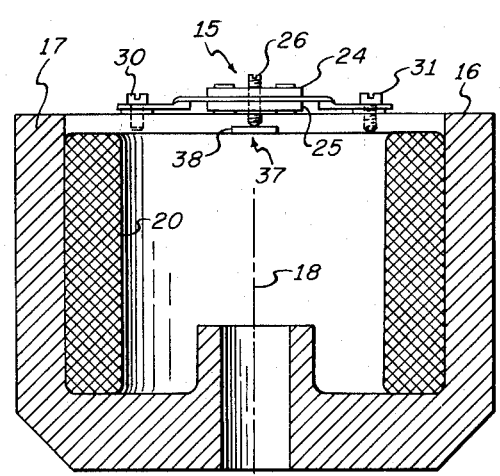
FIG.4.
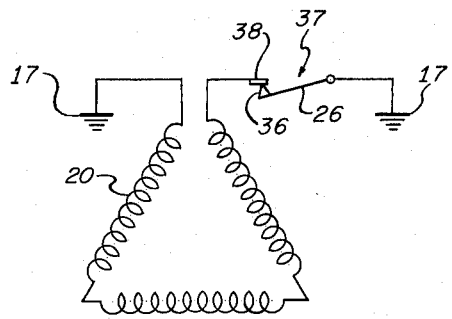
FIG.5.
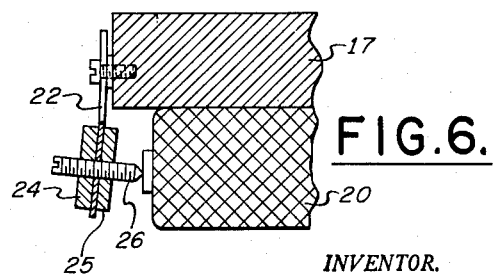
FIG.6.
INVENTOR.
FREDERICK SAPHRA
BY
ATTORNEY April 14, 1964  F. SAPHRA  3,129,301
ANGULAR SPEED RESPONSIVE DEVICE
Filed Nov. 14, 1960  2 Sheets-Sheet 2

INVENTOR.
FREDERICK SAPHRA
BY
ATTORNEY

United States Patent Office 3,129,301
Patented Apr. 14, 1964

3,129,301
ANGULAR SPEED RESPONSIVE DEVICE
Frederick Saphra, Levittown, N.Y., assignor to Sperry Rand Corporation, Great Neck, N.Y., a corporation of Delaware
Filed Nov. 14, 1960, Ser. No. 68,895
1 Claim. (Cl. 200—80)

This invention relates to a device that is responsive to the angular speed of a rotating member wherein the device provides little or no deflection with increasing load up to a critical speed and at and beyond that speed provides an appreciable increase in the rate of deflection with slight increase in speed. The present invention is particularly adaptable for use as a switch or as a governor for rotating machinery.

It is particularly useful as a governor to maintain extremely precise angular speed regulation of, for example, a gyroscopic rotor. Previously, this required a regulated power source which in the case of an A.C. electrically driven rotor required a constant frequency power supply and in the case of a pneumatically driven rotor necessitated a constant pressure source. Regulated power sources of this type are extremely expensive to construct and in certain airborne applications they are undesirably cumbersome and unduly heavy. Another known method is to measure the gyro rotor speed against a fixed frequency or angular speed standard and when the speed limit determined by the standard is exceeded the power to the gyro rotor is cut off. This necessitates auxiliary equipment external to the gyro rotor which is unduly complex and unnecessarily heavy. Further, the prior art devices are relatively inaccurate and subject to variations due to changes in the ambient temperature.

The present invention overcomes the undesirable limitations of the prior art devices by providing a simple, compact angular speed responsive device which fits within the rotor itself. The device is completely self-contained and does not require any external adjustment or auxiliary equipment. The device is extremely accurate and equally applicable to electrically and pneumatically driven rotating machines.

It is an object of the present invention to provide a device responsive to the angular speed of a rotating member which exhibits a low rate of deflection versus speed until a predetermined critical speed is reached and thereafter an appreciable increase in the rate of deflection is exhibited.

It is a further object of the present invention to provide a self-contained, extremely accurate, compact switch responsive to the angular speed of a rotating member which provides a switching action at a predetermined critical speed.

It is another object of the present invention to provide a simple governor device that is adapted for mounting within the rotating member for regulating the angular speed of said member.

The above objects are achieved by the present invention by means of a device responsive to the angular speed of a rotating member comprising a deflectable conditionally stable elastic column mounted for rotation with the rotating member, the column being relatively long along its longitudinal axis with respect to its cross-sectional area and having a non-linear elasticity characteristic whereby at a critical load associated with the critical angular speed of the member an appreciable increase in the rate of deflection versus load occurs and load-producing means rotating with the member for applying a load to the column representative of the angular speed of the member to thereby abruptly deflect the column at the critical speed of the member.

Figure 7:
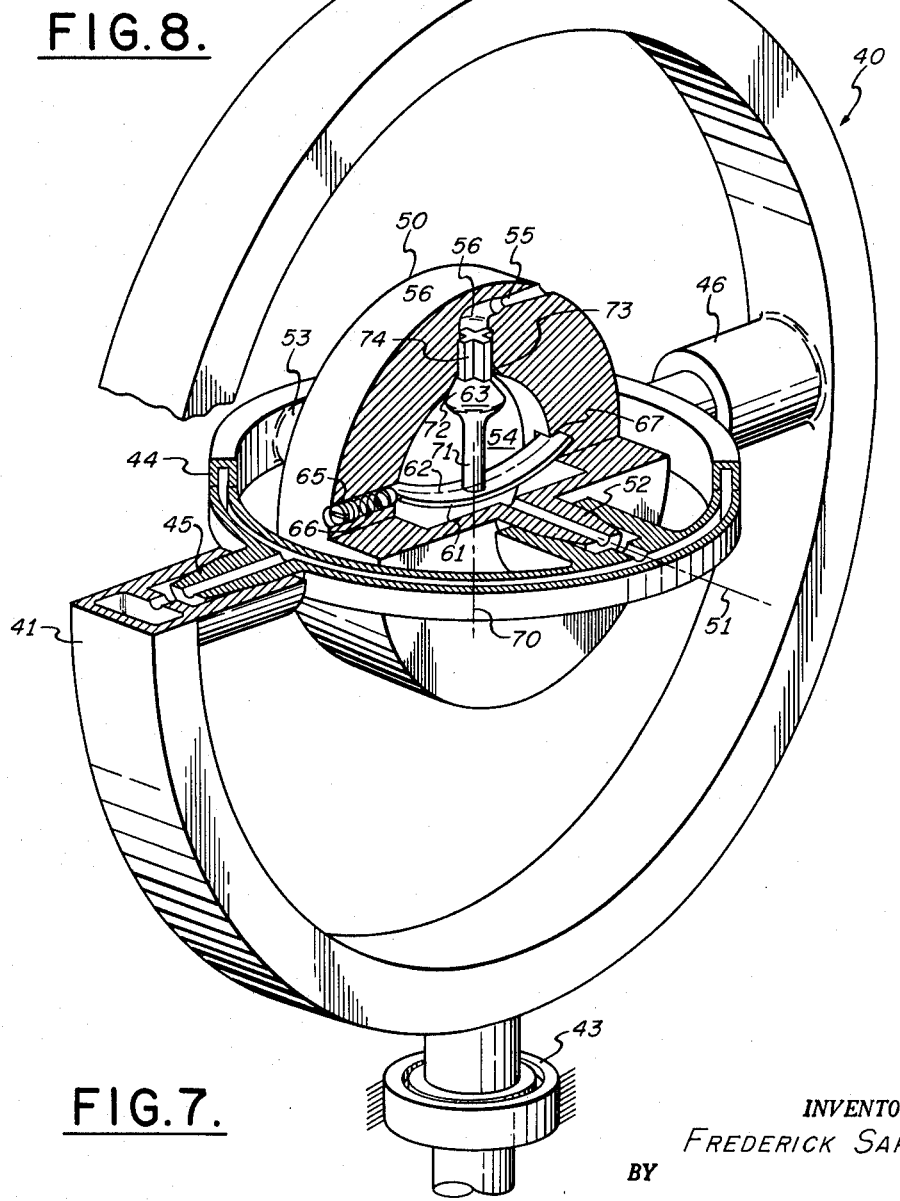

Referring now to the drawings,
FIG. 1 is a schematic view showing a column loaded in accordance with the theory of the present invention;
FIG. 2 is a graph showing the load versus deflection characteristic of the column of FIG. 1;
FIG. 3 is a top view of an electrically driven gyroscopic rotor having a governor embodying the principle of the present invention adapted thereto;
FIG. 4 is a sectional view of FIG. 3 taken along lines 4—4;
FIG. 5 is an electrical schematic wiring diagram of the embodiment of the invention shown in FIG. 3;
FIG. 6 is a partial sectional view of FIG. 3 taken along lines 6—6;
FIG. 7 is a perspective view partially in section of a pneumatically driven gyroscope that is governed by another embodiment of the present invention; and
FIG. 8 is a graph showing the load versus deflection characteristic of the column of FIG. 7.

The operation of the present invention is based upon Euler's theory relating to long columns. Referring to FIG. 1, in accordance with Euler's theory, a long column 10 which is fixed at one end 12 will fail by buckling at a load L less than the elastic limit of the material of the column 10 when the load L is applied in a direction along the longitudinal axis 11 of the column 10. A sudden lateral deflection, as indicated by the dotted line 13, will occur under some critical load and the column 10 is then no longer in equilibrium. The column 10 is thus conditionally stable, i.e. stable below the critical load and unstable at and above the critical load.

By viewing FIG. 2 wherein the load L is plotted against the deflection δ, the abruptness of the rate of increase of deflection at the critical load can be appreciated. A very sharp knee of the curve of FIG. 2 exists when the critical or Euler load is reached. The sharpness of the knee depends upon the general symmetry of the system; the greater the symmetry, the sharper the knee. This extremely radical change of the load-deflection curve around the critical load with the deflection rate becoming extremely high after the critical load has been reached is utilized in the present invention to provide a sensitivity to small changes in speed at a predetermined critical speed.

The present invention will now be described with respect to a governor for electrically and pneumatically driven gyroscopic rotors. It will be appreciated, however, that the present invention is equally adaptable to operate as a device responsive to the angular speed of a rotating member other than a gyroscopic rotor and as other than a governor.

Referring now to FIGS. 3 and 4, the angular speed responsive device 15 of the present invention is mounted on the rim 16 of a gyroscopic rotor 17. The rotor 17 is electrically rotated about its spin axis 18 by means of an A.C. wound rotor induction motor, only the rotor windings 20 of which are shown for purposes of simplicity. The rotor windings 20 are disposed within the rim 16 of the rotor 17.

The speed responsive device 15 comprises a convoluted, U-shaped, flat spring 21 having columns 22 and 23 therein, first and second weights or masses 24 and 52, respectively, and an adjusting screw 26. The extremities of the spring 21 are rigidly connected to the rim 16 of the rotor 17 by means of screws 30 and 31 or other suitable fastening means. The spring 21 is relatively thin having a thickness in the order of .001 inches and is constructed of resilient, conductive material such as heat treated beryllium copper, hardened spring stock, etc. The length of each of the columns 22 and 23 is substantially greater than its respective cross-sectional area thereby coming within the definition of a long column in accordance with the aforementioned Euler's theory.

The masses 24 and 25 are attached on opposite sides of the base of the U-shaped spring 21 by screws or other suitable fastening means in such a way that the centrifugal force exerted by the masses 24 and 25 is applied to the ends of the columns 22 and 23 in a direction along their respective longitudinal axes 34 and 35. The base of the U-shaped spring 21 is widened to accommodate the weights 24 and 25. For dynamic balancing purposes, the rotor 17 has a portion thereof removed to compensate for the added weight due to the device 15.

The adjusting screw 26 protrudes through the weights 24 and 25 and the spring 21 in order that one end thereof acts as one contact 36 of an electrical switch 37. The other contact 38 of the switch 37 is mounted on the rotor windings 20, as shown more clearly in FIG. 5. One extremity of the rotor windings 20 is connected to the contact 38 while the other extremity thereof is connected to the rotor 17. The adjustment screw 26 in its closed condition abutting against contact 38 completes a circuit from the rotor 17 through the windings 20, the switch 37, the screw 26, the spring 21 and back to the rotor 17, all of the elements mentioned immediately above being electrically conductive. As shown in FIG. 6, the adjustment screw 26 also serves to predeflect the columns 22 and 23 to maintain the switch 37 closed with a positive force.

With the device 15 being utilized as a governor to maintain the rotor 17 at a predetermined constant angular speed, the device 15 is designed in order that the centrifugal force due to the masses 24 and 25 at a predetermined or critical speed will apply a critical load to the columns 22 and 23 thereby causing them to abruptly and appreciably deflect in accordance with the above mentioned Euler's theory.

In operation, with the switch 37 closed and below the critical speed, the current induced in the rotor windings 20 causes the gyro rotor 17 to rotate about its axis 18. The predeflection of the resilient columns 22 and 23 by means of the adjusting screw 26 holds the screw 26 firmly against the contact 38 thereby maintaining the switch 37 closed and completing the electrical circuit through the windings 20 to thereby cause the rotor 17 to continue to rotate.

At the critical speed, the centrifugal force applied by the masses 24 and 25 to the ends of the columns 22 and 23 suddenly causes them to buckle and deflect as shown in dotted lines in FIG. 6. The sudden and appreciable deflection of the columns 22 quickly moves the adjusting screw 26 away from the electrical contact 38 thereby opening the switch 37 while simultaneously preventing undesirable arcing. By opening the switch 37, the induced rotor current in the windings 20 is interrupted thereby eliminating the rotor driving torque. The rotor 17 loses its angular speed until switch 37 is again closed by the spring action of the columns 22 and 23 when the rotor speed goes below the critical speed.

The present invention thus provides extreme accuracy in governing the rotor 17 to precisely maintain a constant speed substantially equal to the critical speed because the columns 22 and 23 are stable below the critical speed but become elastically unstable when the sharp knee of the load versus deflection curve is reached at the critical speed. This action provides appreciable deflection of the columns 22 and 23 with only a slight change in load thereby rapidly opening the switch 17 by quickly moving the screw 26 away from the contact 38 and for an appreciable distance which prevents arcing that would be detrimental to the desired speed regulation. It will be appreciated therefore that the precise speed regulation achieved by the present invention cannot be achieved by conventional centrifugal force type governors because without utilizing the principle explained above their response is inadequate to achieve the desired result.

A governor which operates on the same basic principle is shown applied in FIG. 7 to a pneumatically driven director gyro 40. The gyro 40 is supported in a conventional manner for movement around a vertical axis by means of a hollow outer gimbal 41 which is rotatably supported on a chassis, not shown, by means of spaced bearings 42 and 43. A hollow inner gimbal 44 is in turn rotatably supported about a horizontal axis by means of spaced air bearings 45 and 46 disposed on the outer gimbal 41. The inner gimbal 44 in turn rotatably supports the rotor 50 for rotation about its spin axis 51 by means of spaced air bearings 52 and 53.

The rotor 50 is a hollow, pneumatically driven, reaction-turbine-type rotor which is driven by means of air from an air pressure source 48. For ease of manufacturing, the rotor 50 is constructed of two parts that are bolted or otherwise fastened to each other in a conventional manner, not shown. The air pressure source 48 is connected to provide air through conduits in the hollow bearing 42, the hollow outer gimbal 41, the air bearings 45 and 46, the hollow inner gimbal 44, the air bearings 52 and 53 to a centrally disposed inner cavity 54 within the hollow rotor 50. The rotor 50 further includes a reaction nozzle 55 connected by means of a conduit 56 to the cavity 54.

The governor 60 of the present invention is also disposed within the cavity 54. The governor 60 comprises a thin, flat, elastic column 61 having a longitudinal axis 62, a weight or mass 63 which also serves as a throttling valve in a manner to be described, and a set screw 65 and associated helical biasing spring 66. In this embodiment of the present invention, the column 61 is a long column in accordance with the aforementioned Euler theory and it is diametrically disposed within the cavity 54. The column 61 is pre-buckled a predetermined amount by means of the set screw 65 which is screwed to the rotor 50 and bears against a spring 66 which in turn abuts against one end of the column 61 to apply a preload in a direction along the axis 62. The other end of the column 61 is constrained in a slot 67 in the rotor 50.

The mass 63 is disposed with its longitudinal axis 70 perpendicular to the longitudinal axis 62 of the column 61. The lower portion of the mass 63 is in the form of a rod 71 which has its lower extremity fastened to the center of the bowed column 61. The mass 63 in addition to serving as a weight also has an enlarged central portion 72 which cooperates with a matching portion 73 of the conduit 56 to operate as a poppet or throttling valve. The upper portion 74 of the mass 63 is fluted to permit the passage of air through the conduit 56 when the poppet valve portion 72 is not closed.

In order to provide proportional control of the air flow through the nozzle 55 instead of the "on-off" action of the switch 37 of the embodiment of the invention of FIGS. 3 and 4, the column 61 has a load versus deflection characteristic as shown in FIG. 8. This provides proportional control and thus extremely precise angular speed regulation of the rotor 50 in a manner to be described. The mass 63 is designed to provide a centrifugal force which results in an extremely high rate of deflection versus load when the critical load is reached at the desired or critical speed.

In operation, when the gyro 40 is started, the high pressure air from the source 48 is provided through the conduits to the cavity 54 and thence through the fluted portion 74 of the mass 63 and the conduit 56 to the reaction nozzle 55 where it produces a reaction force on the rotor 50 causing it to spin about its axis 51 in a counterclockwise direction as indicated by the arrow.

As the rotor 50 approaches its desired or critical angular speed, the mass 63 will, due to centrifugal action, apply a force radially in an outward direction along the axis 71 which will be transmitted to the attached column 61. The column 61 will deflect as a result of this load in accordance with the graph of FIG. 8 thereby causing the poppet valve portion 72 of the mass 63 to begin to throttle the air through the conduit 56 and thus the nozzle 55.

At and above the critical speed, the load applied by the mass 63 is critical and the rate of deflection versus load is a maximum thereby closing off the air supply to the nozzle 55 causing the rotor 50 to slow down. As the angular speed of the rotor 50 goes below the critical speed, the valve 72 again opens in accordance with the graph of FIG. 8 and permits air to flow through the nozzle 55 thereby causing the rotor 50 to increase its speed. The speed regulation is extremely fine in the region in which the velocity of the rotor has to be governed since the throttling effect in this embodiment of the invention is continuous and proportional instead of "on-off."

It will be appreciated that both embodiments of the invention rely on the non-linear behavior of conditionally stable elastic columns and take advantage of the very large increase of deflection with little or no increase in load once the range of critical stability has been reached. The present invention provides extremely accurate speed regulation in spite of wide variation in the frequency and/or voltage of the electrical source or the pressure of the pressure fluid source.

While the invention has been described in its preferred embodiments, it is to be understood that the words which have been used are words of description rather than of limitation and that changes within the purview of the appended claim may be made without departing from the true scope and spirit of the invention in its broader aspects.

What is claimed is:

An angular speed responsive switch comprising a rotating member having an axis of rotation comprising a deflectable conditionally stable elastic column mounted for rotation with said rotating member, said column being relatively long along its longitudinal axis with respect to its cross-sectional area and having a non-linear elasticity characteristic whereby at a critical load associated with a critical angular speed of said member an appreciable increase in the rate of deflection versus load occurs, said longitudinal axis being disposed substantially in a plane perpendicular to said axis of rotation, load-producing means rotating with said member and effectively connected to an extremity of said column for applying a compressive load to said column in the direction of said longitudinal axis representative of the angular speed of said member to thereby abruptly deflect said column at said critical speed of said member, said load-producing means being disposed to move substantially parallel with respect to said axis of rotation, and switch means having one contact mounted on said rotating member and another contact mounted on said column whereby below said critical speed said contacts abut and above said critical speed said contacts are spaced, in the latter case due to the abrupt deflection of said column.

References Cited in the file of this patent

UNITED STATES PATENTS

| | | |
|---|---|---|
| Re. 20,993 | Groot | Jan. 31, 1939 |
| 1,025,618 | Fish | May 7, 1912 |
| 1,781,610 | Torok | Nov. 11, 1930 |
| 1,984,512 | Anderson | Dec. 18, 1934 |
| 2,503,950 | Johnson | Apr. 11, 1950 |
| 2,691,516 | Fischer | Oct. 12, 1954 |
| 2,779,582 | Hopper et al. | Jan. 29, 1957 |
| 2,903,535 | Sparklin | Sept. 8, 1959 |
| 2,938,974 | Querfurth | May 31, 1960 |